July 7, 1936.  A. G. ANDREWS  2,046,599
SCRAPER
Filed April 28, 1933
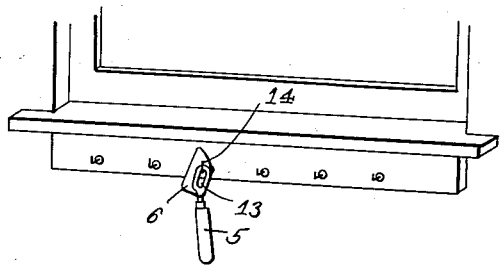
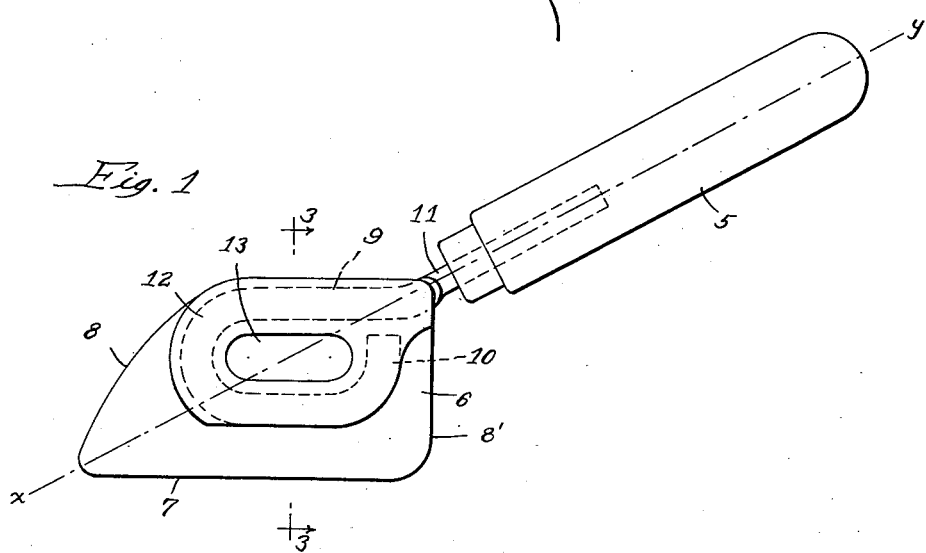
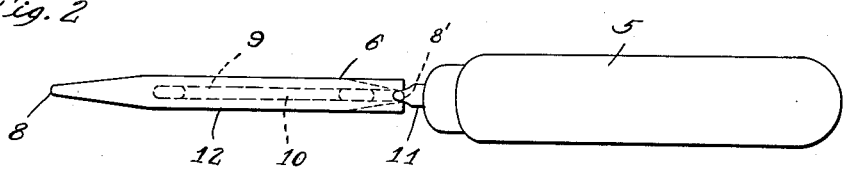
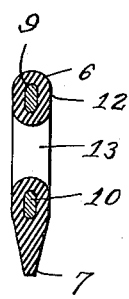
Inventor
Arthur G. Andrews
By Wilson, Dowell,
McCanna & Wintercorn
Attys.

Patented July 7, 1936

2,046,599

UNITED STATES PATENT OFFICE 2,046,599

SCRAPER

Arthur G. Andrews, Rockford, Ill., assignor to The Washburn Company, Worcester, Mass., a corporation of Massachusetts Application April 28, 1933, Serial No. 668,334

8 Claims. (Cl. 15—245)

This invention relates to kitchen utensils and has particular reference to a scraper of the type having a flexible rubber blade suitable for use as a plate or batter scraper, sink scraper and the like.

The principal object of my invention is to provide a scraper of a new design having the handle at such an angle to the working edges of the blade that the scraper is worked with a sidewise rather than an endwise motion, for greater efficiency and less likelihood of fatigue.

Another object is to provide a scraper having an opening formed in the blade by special forming of the reinforcement and molding of the blade to conform thereto, whereby to permit hanging the utensil on a hook or nail when not in use.

The invention is illustrated in the accompanying drawing, in which—

Figures 1 and 2 are a side and top view, respectively, of the scraper of my invention;

Fig. 3 is a cross-section on the line 3—3 of Figure 1, and

Fig. 4 is a perspective illustrating how the scraper may be hung up.

Utensils of this kind have heretofore had only a single working edge and were designed to be worked like a putty knife; that is, by endwise motion. Since such operation is by no means efficient and is more or less awkward and tedious, it is one object of my invention to provide a scraper in which the handle 5, instead of extending from the middle of the back of the blade 6, at right angles to the single working edge on the lower end, extends in the manner shown from one end of the blade at an acute angle with respect to the two side edges 7 and 8. In that way the scraper is worked with a sidewise motion which is easier and far more efficient. Furthermore, the two edges make the tool better adapted for the purpose intended; the edge 7 is straight to work on flat surfaces in cleaning plates and the like or for cleaning a sink, and the edge 8 is shown curved to fit the inside of bowls, although it may also be made straight. It will be observed that the edges 7 and 8 are substantially at the same angle with respect to the longitudinal axis $x$—$y$ of the scraper. In that way the tool is as well balanced in working with one edge as with the other, and the handle is at the most convenient angle with respect to the surface being worked upon, whether it be flat or curved. The blade 6 is of molded rubber for flexibility so as to wipe clean like a squeegee. The blade is tapered toward the two edges 7 and 8, as clearly appears in Figs. 2 and 3. The rear end of the blade may also be formed with a taper as shown so as to provide still another working edge 8', useful in certain places where the other edges 7 and 8 would not be as handy.

9 is a reinforcement for the blade 6 formed preferably from a piece of rod or heavy wire large enough in cross-section to serve as a handle and bent into an eye 10 with a shank portion 11 arranged to project from the blade at the proper angle to serve as the handle portion. While I have shown the use of wire, it will be evident that a sheet metal stamping or some other material might be employed. The shank 11 will have a drive fit in the handle although, of course, any suitable method of fastening may be employed. Due to the fact that the wire insert is of relatively large diameter in relation to the thickness of the rubber blade the eye portion 10 is flattened in the plane of the blade, as clearly appears in Figs. 2 and 3 so as not to take up too much of the thickness of the blade 6 molded thereon and so as to present broad flat surfaces on which the rubber of the blade will adhere readily when molded thereon. The blade is preferably thickest throughout the area 12 covering the reinforcement 9 and tapers from this portion toward the working edges 7, 8, and 8', as shown. An opening 13 is molded in the blade in register with the eye 10, thus correspondingly lightening the tool and saving material, besides providing an opening to receive a hook or nail 14 on which the tool can be hung up when not in use.

The scraper may be manufactured at a low cost and, as pointed out above, presents numerous practical advantages over other utensils made for a similar purpose. The construction is obviously extremely durable since the reinforcement has an unusually large area of contact with the rubber of the blade, and is furthermore formed so that there is no likelihood of its cutting through the rubber, that having been one of the principal objections to previous designs, especially where sheet metal or other reinforcements having sharp edges were employed.

I claim:

1. A scraper of the kind mentioned comprising a molded flexible rubber blade, and a reinforcing insert of slightly smaller cross-section in relation to the cross-section of said blade whereby it is adapted to serve as a handle therefor, said insert being embedded in and projecting from the blade to provide a handle portion, said insert having an opening therein spaced from the handle portion and within the blade and said blade being provided with a registering opening extending therethrough for the purpose specified.

2. A scraper of the character described comprising a rubber blade of elongated quadrilateral form, and a wire insert of large enough cross-section in relation to the thickness of the blade to serve both as a stiff reenforcement for the blade and as a handle, said wire being bent to provide an elongated quadrilateral loop embedded in the upper portion of the blade for reenforcement and stiffening of the full length thereof, the wire being further bent to provide a handle portion projecting diagonally upwardly from one upper corner of the blade.

3. A scraper as set forth in claim 2, wherein that portion of the wire member projecting from the blade is of circular cross-section and of a diameter that is large in relation to the thickness of the rubber blade, and that portion embedded in the blade is flattened throughout its length in the plane of the blade to a thickness that is small in relation to the thickness of the blade, for the purpose specified.

4. A scraper as set forth in claim 2, wherein that portion of the wire member projecting from the blade is of circular cross-section, and that portion embedded in the blade is flattened throughout its length in the plane of the blade, and the blade has an opening provided therein registering with the opening in the embedded loop, for the purposes specified.

5. A scraper as set forth in claim 2, wherein the blade has an opening provided therethrough registering with the opening in the embedded loop for the purpose stated.

6. A scraper of the character described comprising a rubber blade having flexible scraping edge portions and a relatively stiff butt portion from which the scraping edge portions extend, and a wire insert member extending from the blade to provide a handle portion, the wire member being of large enough cross-section in relation to the thickness of the blade to serve as a handle therefor and being formed with an enlarged loop conformed to the outline of the butt portion of said blade and flattened throughout its length in the plane of the blade and embedded therein to reenforce and stiffen said butt portion throughout its entire area.

7. A scraper as set forth in claim 6, wherein the blade has an opening provided therein through the butt portion registering with the opening in the embedded loop, for the purpose stated.

8. A scraper comprising a molded blade of suitable material, the same having one or more scraping edges thereon, and an insert embedded in said blade and having a handle portion extending from the blade, said insert having an opening therein and said blade having a registering opening for the purpose stated.

ARTHUR G. ANDREWS.